(12) United States Patent
Wrzyszczynski

(10) Patent No.: US 7,478,483 B2
(45) Date of Patent: Jan. 20, 2009

(54) ADJUSTABLE SUPPORT APPARATUS AND METHOD

(75) Inventor: Mark Dorner Wrzyszczynski, Houston, TX (US)

(73) Assignee: Shell Oil Company, Houston, TX (US)

( * ) Notice: Subject to any disclaimer, the term of this patent is extended or adjusted under 35 U.S.C. 154(b) by 54 days.

(21) Appl. No.: 11/416,808

(22) Filed: May 3, 2006

(65) Prior Publication Data

US 2007/0214670 A1 Sep. 20, 2007

Related U.S. Application Data

(60) Provisional application No. 60/678,071, filed on May 5, 2005.

(51) Int. Cl.
*G01B 5/24* (2006.01)

(52) U.S. Cl. ............................................ 33/412; 33/645

(58) Field of Classification Search ........................ None
See application file for complete search history.

(56) References Cited

U.S. PATENT DOCUMENTS

| | | | | |
|---|---|---|---|---|
| 3,596,898 A | | 8/1971 | Hilburn .................... 269/243 |
| 4,116,015 A | * | 9/1978 | Duncan ..................... 405/169 |
| D252,255 S | | 7/1979 | Uyeda ........................ D8/394 |
| 4,309,263 A | | 1/1982 | Boyd .......................... 204/197 |
| 4,522,439 A | * | 6/1985 | Haney ...................... 294/110.1 |
| 4,759,536 A | | 7/1988 | Takeuchi et al. ............. 269/303 |
| 4,832,530 A | * | 5/1989 | Andersen et al. ............ 405/170 |
| 5,092,711 A | | 3/1992 | Lagner ....................... 405/169 |
| D329,007 S | | 9/1992 | Yoder .......................... D8/73 |
| 5,795,093 A | | 8/1998 | Seaton et al. ............... 403/322 |
| 5,833,428 A | * | 11/1998 | Szinte ........................ 414/408 |
| 5,960,689 A | * | 10/1999 | Warren ........................ 414/14 |
| D440,139 S | | 4/2001 | Michell ........................ D8/72 |
| D484,017 S | | 12/2003 | Knox ........................... D8/72 |
| D488,044 S | | 4/2004 | Varizino ....................... D8/75 |
| D494,828 S | | 8/2004 | Phillips ........................ D8/72 |
| 6,789,578 B2 | * | 9/2004 | Latham et al. ................ 138/89 |
| D500,238 S | | 12/2004 | Varizino ....................... D8/72 |
| 6,948,222 B1 | * | 9/2005 | Greer et al. ................... 29/235 |
| 2007/0140821 A1 | * | 6/2007 | Garon et al. ................. 414/618 |

FOREIGN PATENT DOCUMENTS

GB 2402950 12/2004

* cited by examiner

*Primary Examiner*—Yaritza Guadalupe-McCall
(74) *Attorney, Agent, or Firm*—William E. Hickman

(57) ABSTRACT

An adjustable support comprising: a first gripper, a second gripper separated from the first gripper by a distance, a first block connectable to the first gripper, a second block connectable to the second gripper, an alignment element connectable to the first block and the second block, which adjusts the distance between the first gripper and the second gripper when it is turned.

9 Claims, 8 Drawing Sheets

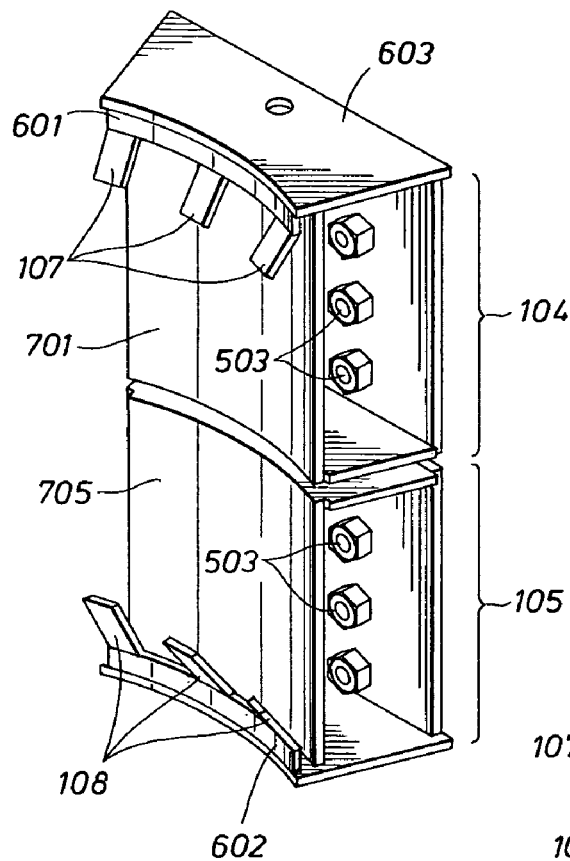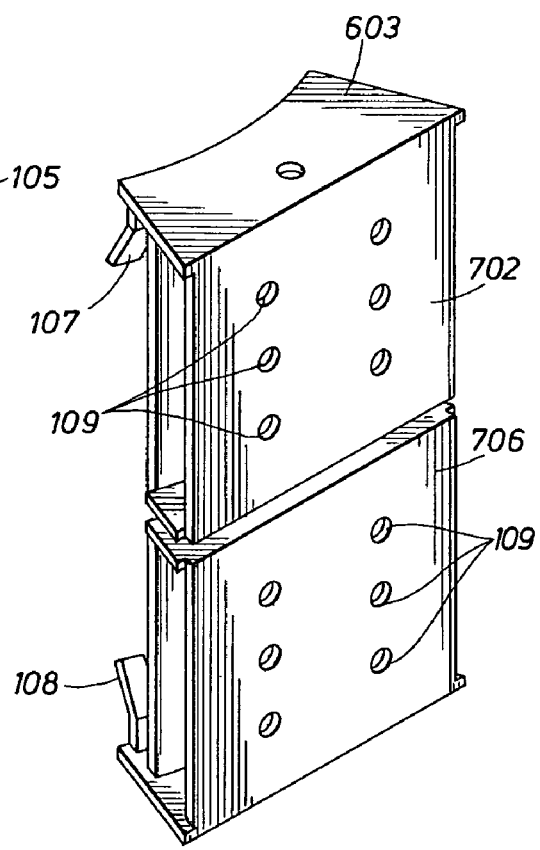
FIG. 6A
FIG. 6B

ADJUSTABLE SUPPORT APPARATUS AND METHOD

RELATED APPLICATIONS

This application claims priority from related U.S. Patent Application Ser. No. 60/678,071 filed May 5, 2005 entitled "Adjustable Support Apparatus and Method."

FIELD OF INVENTION

The present invention relates to an adjustable support for use in the stabilization or movement of large components.

BACKGROUND OF THE INVENTION

Supports and clamps are traditionally used to stabilize or move different objects for a variety of different industrial applications. Some industries, such as oil and gas and construction, require the use of specially designed clamps to accommodate large and heavy objects. Because the dimensions of a component are not always known, these industries could benefit from the use of a single clamp that can be configured to grab an object of unknown dimensions.

The exploitation of offshore oil and gas production often involves moving or stabilizing subsea components including risers, pipelines, and structural supports. Because the dimensions of the target structure are not always known, the conventional method for doing this involves sending a diver or Remotely Operated Vehicle (ROV) to the site of the component, gathering measurements, and fabricating a custom clamp for use with the component. The fabrication and welding of the clamp is typically done offshore. The process is rather lengthy and a second trip to the site is required for installation.

In the alternative, a premade clamp that was manufactured onshore and includes "field weld," that allows for later adjustments of the clamp dimensions can be used. After the diver or ROV return with measurements from the site, the pre-made clamp can be welded offshore on the deck of a boat to fit the necessary dimensions. Although this process is not as time consuming as fabricating a custom clamp, it still requires two visits to the site. In addition, welding done onshore in a fabrication shop is typically stronger than welding done offshore on the deck of a boat.

GB patent application 2402950A discloses an attachment apparatus for attaching objects to a subsea structure. The disclosed apparatus comprises attaching members moveable between an open configuration and a closed configuration, arranged in such a way that they are moveable relative to one another. The placing of the attachment apparatus on the subsea structure causes the attaching members to automatically close around the subsea structure. The attachment apparatus is attached to a guidepost or other guideline or guidewire system. A disadvantage of this system is that a single clamp is restricted to grabbing objects that fall within a limited range of sizes and geometries. It is also not designed to provide torsional stability. Therefore, specific clamps must be designed and manufactured for a particular application.

SUMMARY OF THE INVENTION

One aspect of the invention provides an adjustable support comprising: a first gripper, a second gripper separated from the first gripper by a distance, a first block connectable to the first gripper, a second block connectable to the second gripper, an alignment element connectable to the first block and the second block, which adjusts the distance between the first gripper and the second gripper when it is turned.

Another aspect of the invention provides a method for supporting a component of unknown dimensions with a set of first grippers connectable to a first block moveable along an alignment element and a set of second grippers connectable to a second block moveable along the alignment element comprising adjusting the position of the grippers to conform with the dimensions of the component and engaging the grippers to stabilize the component by turning the alignment element.

BRIEF DESCRIPTION OF THE DRAWINGS

The present invention is better understood by reading the following description of non-limiting embodiments with reference to the attached drawings, wherein like parts of each of the figures are identified by the same reference characters, and which are briefly described as follows:

FIGS. 6A and 6B both illustrate perspective views of a block assembly.

DETAILED DESCRIPTION OF THE INVENTION

Figure 1:
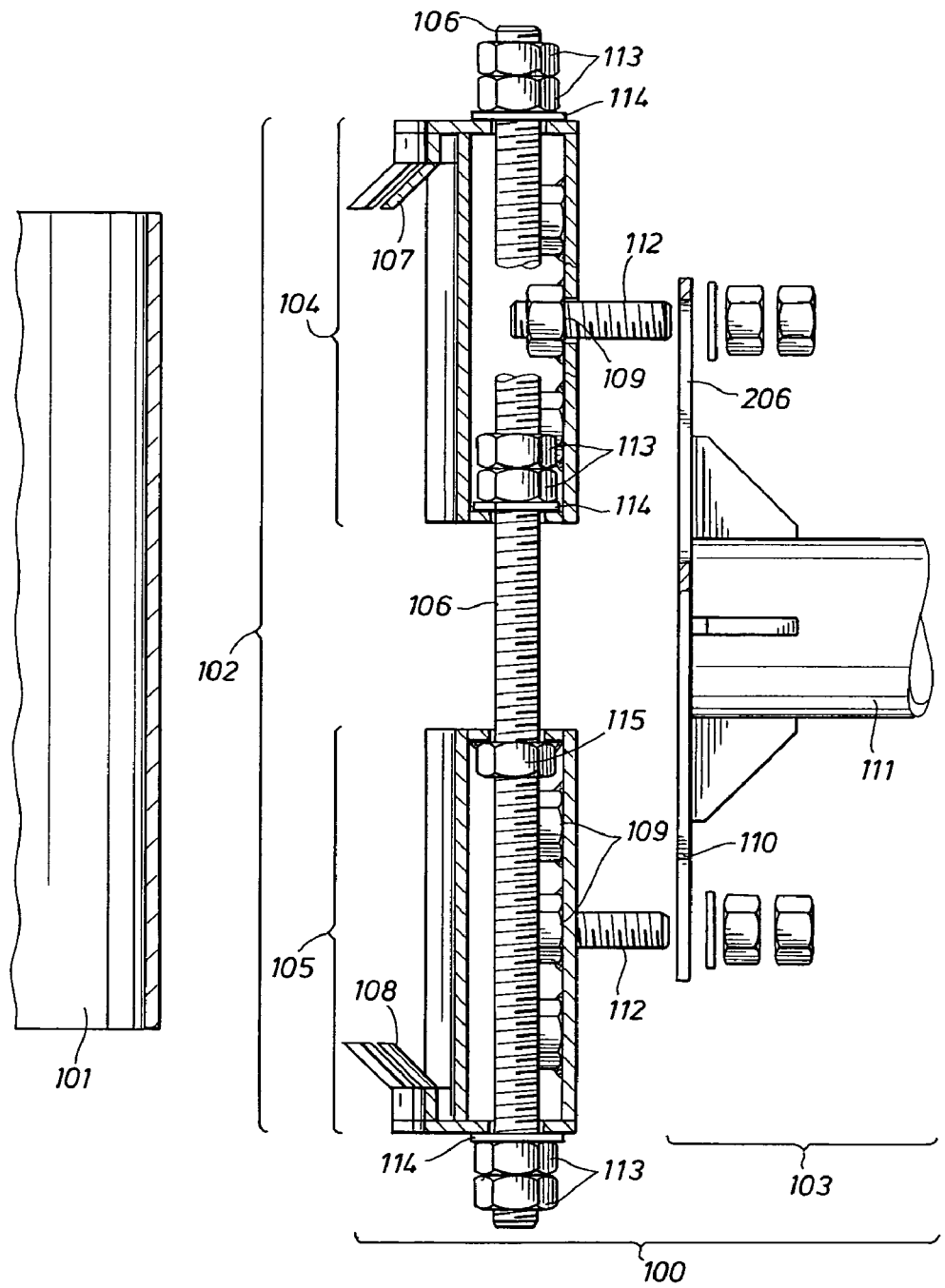
FIG. 1 illustrates a side view of an adjustable support in an open configuration.

Referring to FIG. 1, a side view of the adjustable support 100 is shown in an open configuration ready to grip target object 101. Target object 101 could be a riser, pipeline, riser support, subsea well structure, tree, sled, jacket leg, umbilical, tie-in brace for subsea pipelines or any other component in need of repair or stabilization. Adjustable support 100 comprises block assembly 102 and standoff 103. Block assembly 102 consists of first block 104 and second block 105, which are connected by alignment element 106. In the embodiment shown, alignment element 106 is a threaded screw; however, gears, hydraulics, a combination of right and left hand threaded screws, any combination of screws, gears, and hydraulics, or another system could be used to perform this function. Block assembly 102 features first gripper 107 connected to first block 104 and second gripper 108 connected to second block 105. The grippers serve as fingers capable of grasping target object 101, and may be formed in whatever geometry is most suitable for target object 101. The position of first gripper 107 and second gripper 108 can be adjusted by sliding first block 104 and second block 105 along different positions on alignment element 106.

Block assembly 102 may have connection holes 109, which aid in connecting standoff 103 to block assembly 102. Standoff 103 is made up of backing plate 110 and arm 111, which are connected by welding or other connection means.

Once first block 104 and second block 105 have been positioned along alignment element 106, standoff 103 can be connected to block assembly 102 by placing fasteners 112 in desired connection holes 109. Fasteners 112 can be screws, rivets or any other device capable of performing this function. The positions of first block 104 and second block 105 are secured by nuts 113 and washers 114. Fixed nut 115 is welded to second block 105 and tightens as alignment element 106 moves.

In some embodiments, the invention is used by transporting adjustable support 100 to the location of target object 101 and engaging first gripper 107 and second gripper 108 with target object 101. As the grippers are closed, first block 104 and second block 105 are capable of translating along alignment element 106 in line with tracks 206 shown in FIG. 2. As the grippers close on the object, the adjustable support 100 automatically aligns itself to fit the target object 101 and adjusts for misalignment along the axis of closure.

Figure 2:
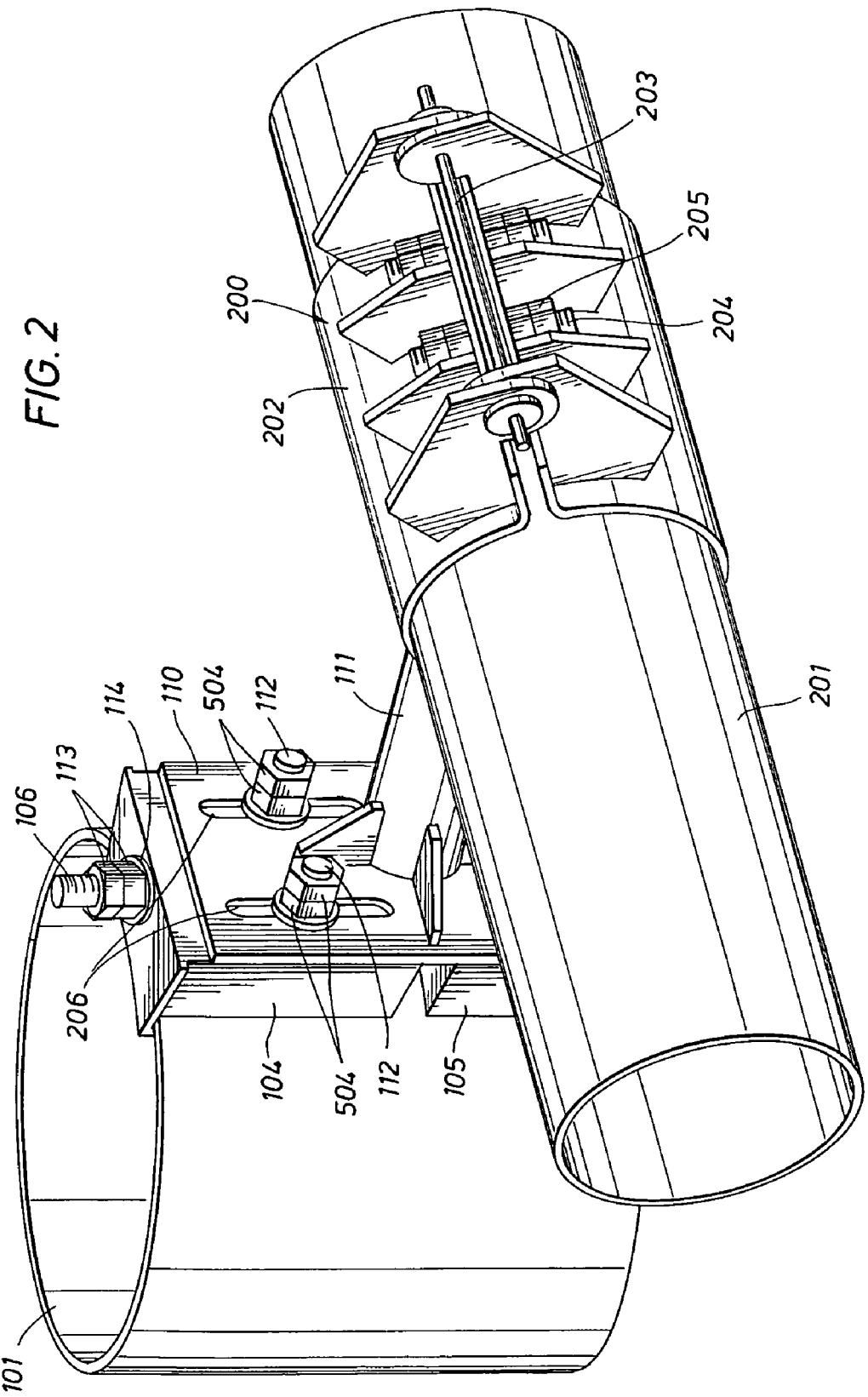
FIG. 2 illustrates a perspective view of the adjustable support gripping a target object by holding it from top to bottom. In this figure, a backing plate is shown with tracks oriented parallel to an alignment element.
Figure 3:
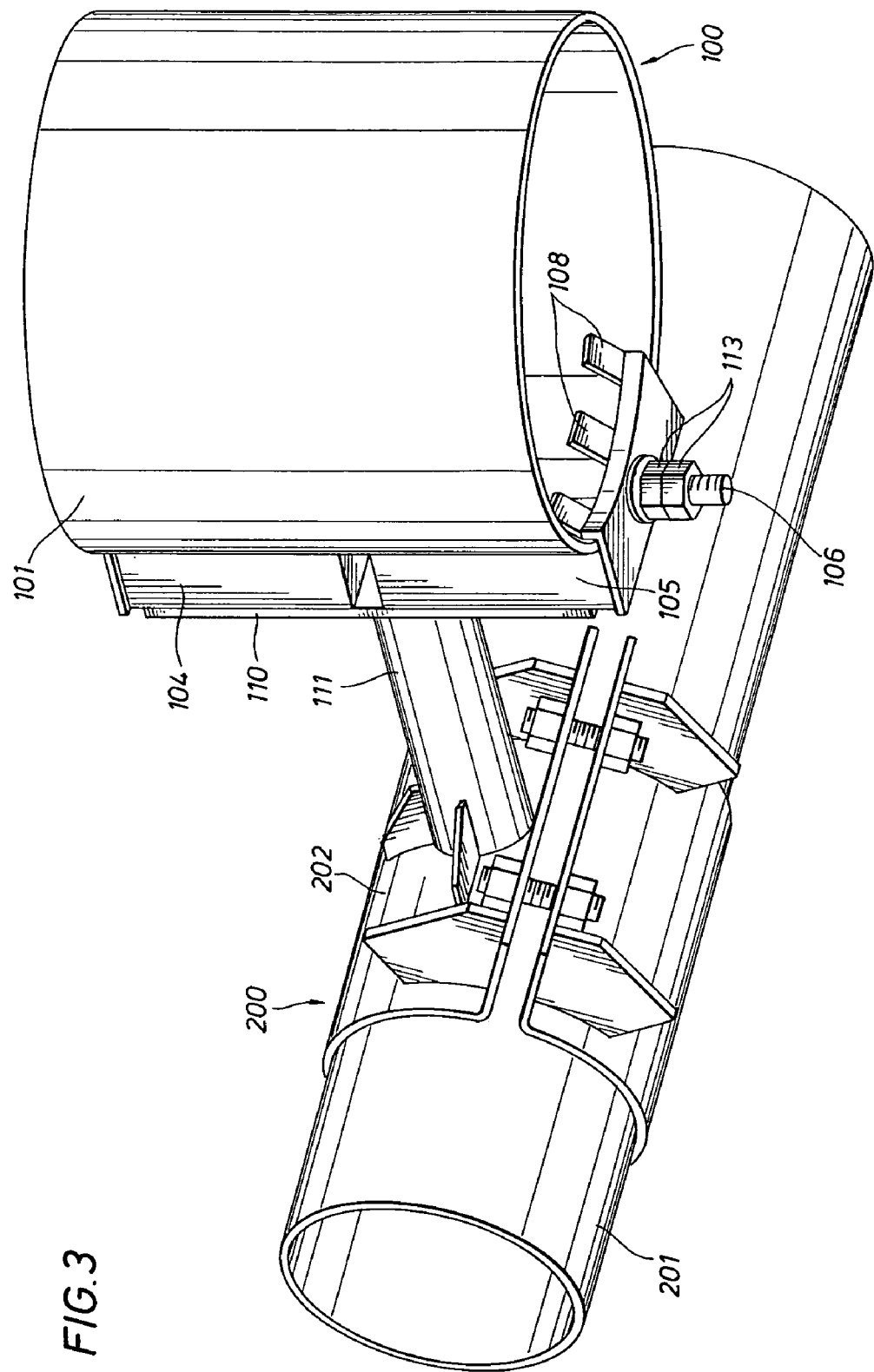
FIG. 3 also illustrates a perspective view of the adjustable support gripping the target object by holding it from top to bottom. In this figure, the backing plate is shown with the tracks oriented parallel to the alignment element.

Referring now to FIGS. 2 and 3 adjustable support 100 is shown from two different angles stabilizing target object 101. Conventional clamp 200 is shown clamped to structural component 201. Structural component 201 could be part of a riser, a platform jacket, or any other structure. Conventional clamp 200 consists of body 202, hinge 203, and bolts 204 and nuts 205 used to secure the position of conventional clamp 200 around structural component 201. Standoff 103, arm 111, and back plate 110 are also visible in this FIGS. 2 and 3. Body 202 is connectable to standoff 103. Tracks 206, which can be milled into backing plate 110 are visible in the view shown in FIG. 2.

Figure 4:
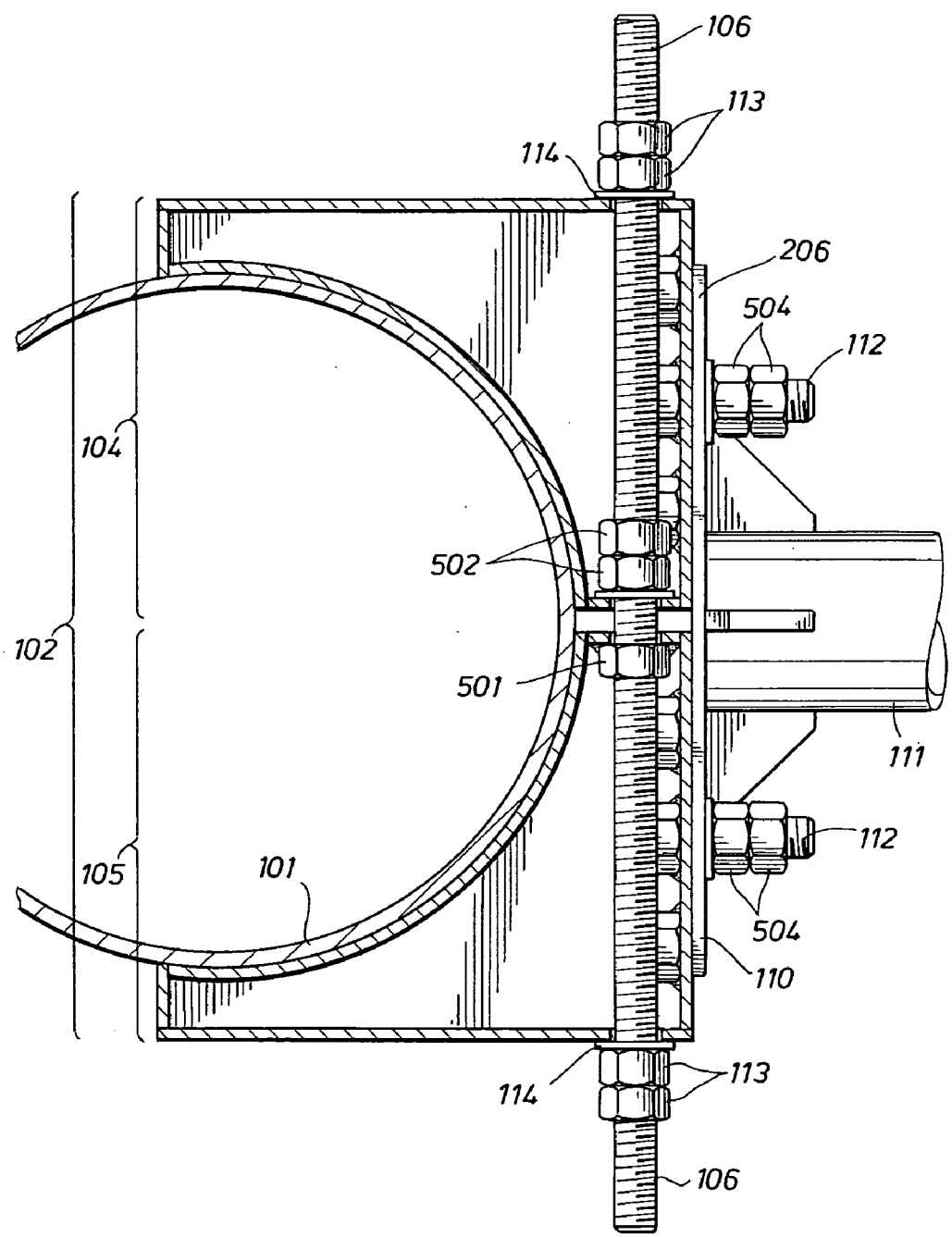
FIG. 4 illustrates a perspective view of the adjustable support gripping the target object by its circumference.

In the embodiment shown, adjustable support 100 is grabbing target object 101 from top to bottom; however, different grasping configurations could be used. For example, adjustable support 100 could be configured to grasp target object 101 by its circumference as shown in FIG. 4. In addition, target object 101 shown is cylindrical, but the invention could be used to stabilize objects of varying size such as risers, pipelines, riser supports, subsea well structures, trees, sleds, jacket legs, umbilicals, tie-in braces for subsea pipelines or damaged components.

Figure 5:
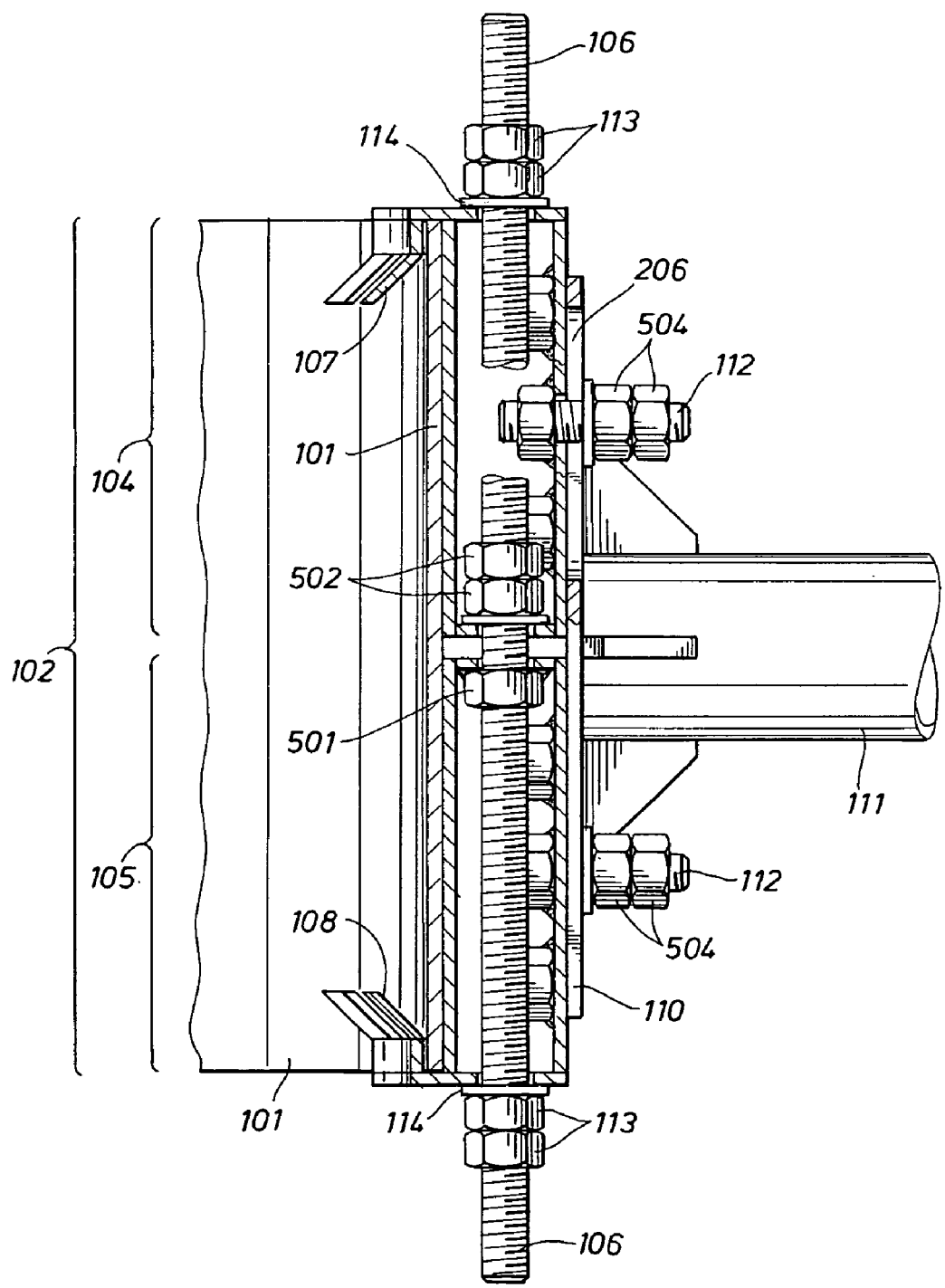
FIG. 5 illustrates a side view of the adjustable support in a closed configuration.

Referring to FIG. 5, a side view of the adjustable support 100 is shown in a closed configuration. Alignment element 106 is shown running through first block 104 and second block 105. In this embodiment, alignment element 106 is a right hand threaded screw with one reaction nut 501 and one set of jam nuts 502. Reaction nut 501 does not turn when alignment element 106 is rotated. Jam nuts 502 are either jammed together or tack welded so that they turn with alignment element 106. In another embodiment, alignment member 106 could be right handed threaded on the upper end and left hand threaded on the lower end so that two reaction nuts 501 could be used. Standoff 103 is attached to block assembly 102 by placing fasteners 112 in the desired position along tracks 206 in backing plate 110 and securing them with alignment nuts 504.

Referring to FIGS. 6A and 6B, perspective views of block assembly 102 are shown. FIG. 6A displays a front view of block assembly 102. FIG. 6A shows how first gripper 107 may be connected to first block 104 with first guide piece 601. Likewise, the connection of second gripper 108 to second block 105 by second guide piece 602 is also shown. FIG. 6B shows a back view of block assembly 102. Jam nuts 503 are connected to connection holes 109. Also, alignment hole 603 for insertion of alignment element 106 is depicted.

Figure 7:
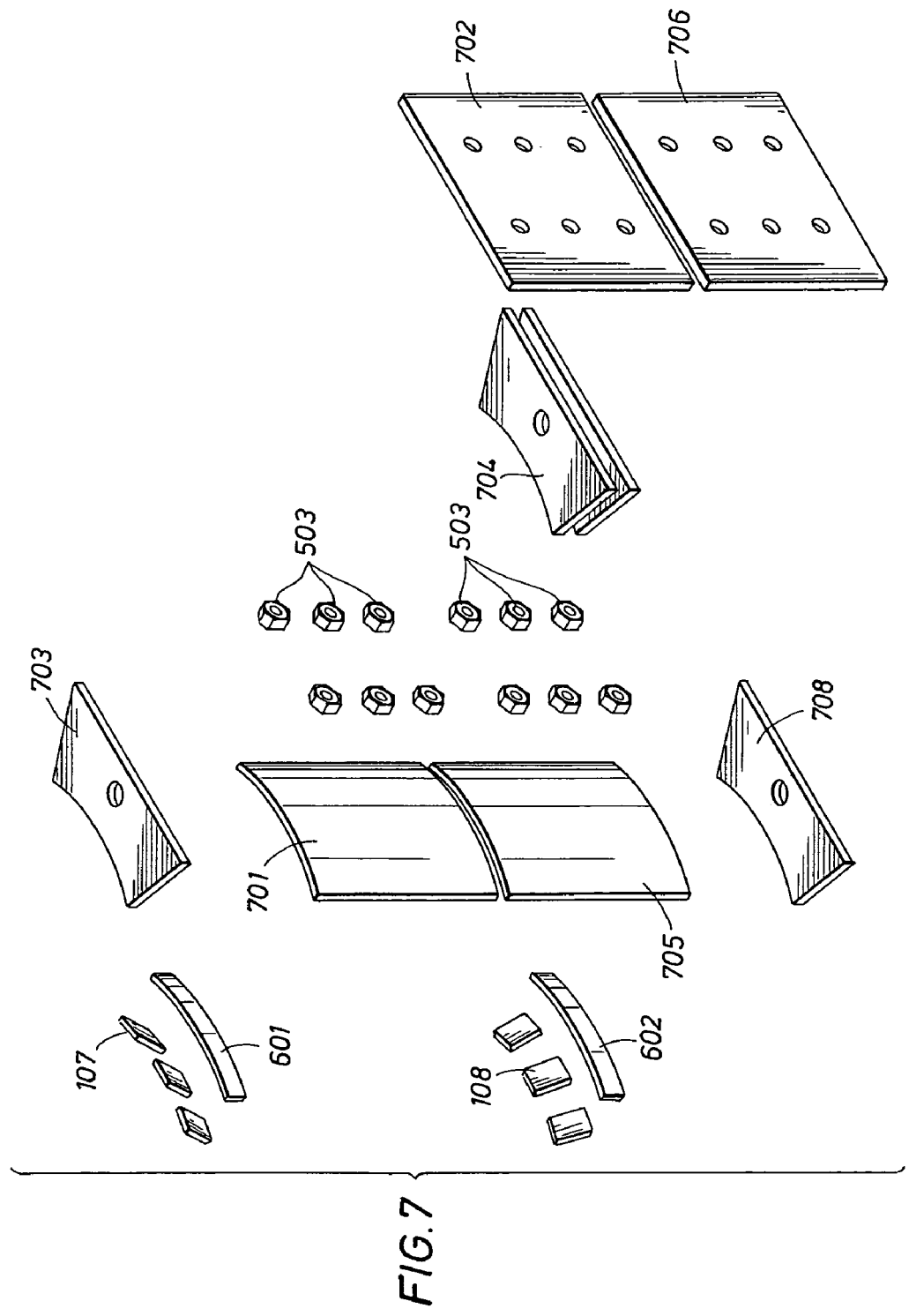
FIG. 7 illustrates a perspective view of the block assembly in a disassembled configuration.

Referring to FIG. 7, an exploded view of block assembly 102 in a disassembled configuration is shown. First block 104 is made up of side plates 701 and 702 and end plates 703 and 704. Second block 106 is made up side plates 705 and 706 and end plates 707 and 708. In some embodiments, the components shown are made of steel; however, a variety of materials suitable for the offshore environment could be used. If corrosion is likely to cause a problem with the metal, materials like titanium, stainless steel, or a combination of these could be used.

Figure 8:
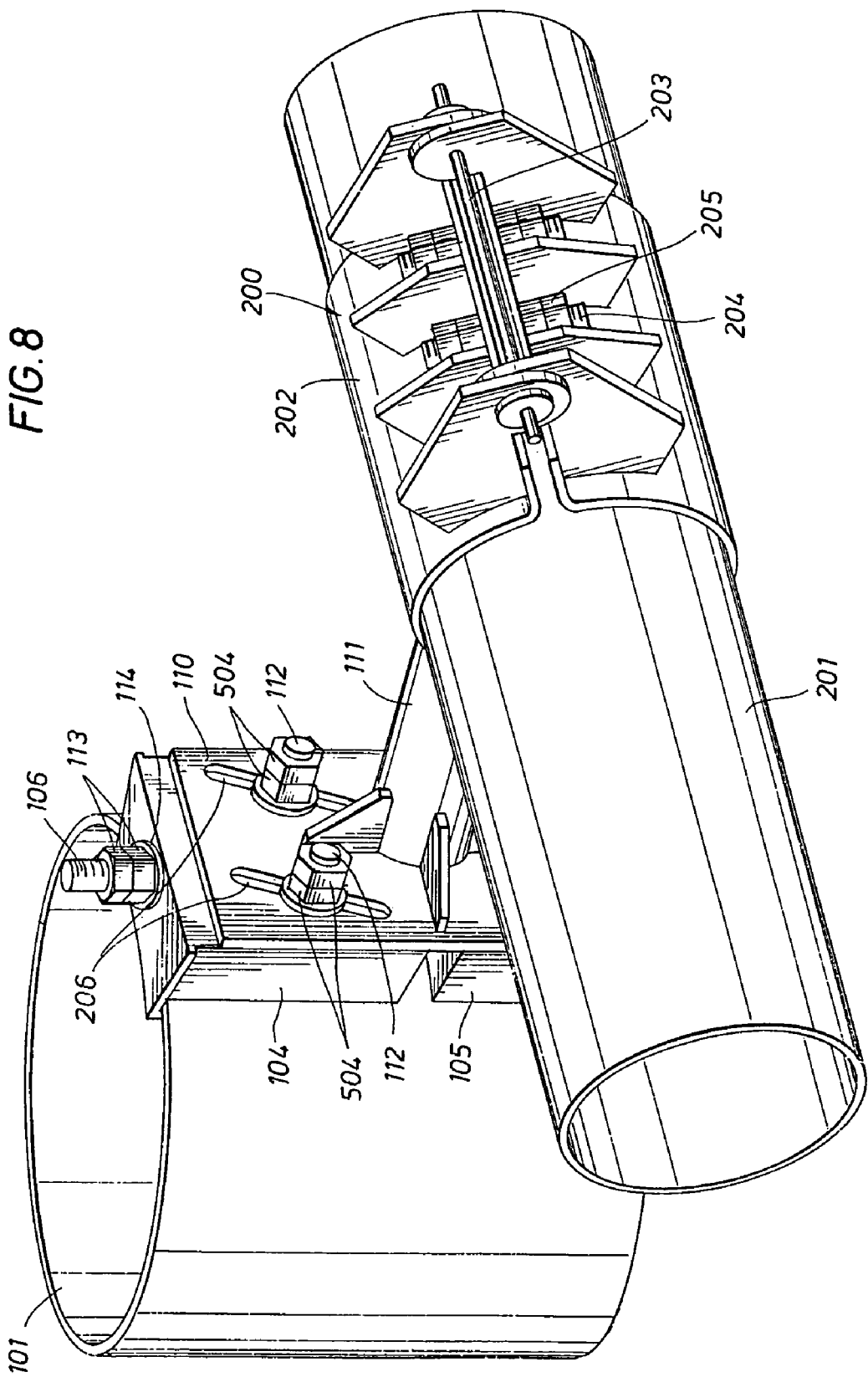
FIG. 8 illustrates another embodiment of the adjustable support.

Referring to FIG. 8, adjustable support 100 is shown gripping target object 101. Whereas the previous embodiments showed the tracks 206 in a parallel configuration relative to alignment element 106, this embodiment shows that tracks 206 can be arranged in any other configuration as long as they are not completely perpendicular to alignment element 106. Many other configurations are possible.

The present invention enables an operator to use a single adjustable support to grasp subsea objects of various shapes and sizes. Grippers of varying shapes and textures may be used to accommodate gripping of pipes, I beams, and other subsea components. Another potential advantage of the present invention is that it may eliminate the need to send a ROV or diver to the site to take measurements before installation. Because the support is adjustable, it may be installed in a single trip, which results in significant cost savings. Yet another advantage is that the present invention may be significantly more durable than a conventional clamp that is welded offshore. The present invention may be manufactured onshore in a fabrication shop, which results in a more reliable weld and is significantly cheaper than welding offshore on the deck of a boat. Another advantage is that the present invention may provide better torsional stability than other clamps and supports. Because the design involves few moving parts and all components are locked before a load is applied, the likelihood that the target object will be dropped is small. Another advantage is that the present invention may be re-used; this could allow the operator to keep a set number of adjustable clamps in inventory for immediate use.

Those of skill in the art will appreciate that many modifications and variations are possible in terms of the disclosed embodiments, configurations, materials, and methods without departing from their spirit and scope. Accordingly, the scope of the claims appended hereafter and their functional equivalents should not be limited by particular embodiments described and illustrated herein, as these are merely exemplary in nature.

What is claimed is:

1. An adjustable support comprising:
    a first gripper;
    a second gripper separated from the first gripper by a linear distance;
    a first block connectable to the first gripper;
    a second block connectable to the second gripper;
    an alignment element connectable to the first block and the second block, which moves at least one of the first gripper and the second gripper in a linear manner when it is turned to adjust the linear distance between the first gripper and the second gripper;
    a standoff connectable to the first block and the second block, wherein the standoff comprises an arm, which is connectable to a backing plate having one or more tracks;
    wherein the first block and the second block each comprise one or more side plates, each optionally having one or more connection holes and one or more end plates, each having one or more alignment holes;
    wherein the position of the first block and the second block along the alignment element is secured by tightening fasteners located above the first block, below the second block, and between the first block and second block.

2. The adjustable support of claim 1 wherein some or all of the fasteners are welded in position.

3. The adjustable support of claim 2, wherein the first grippers, second grippers, side plates, and end plates are shaped to accommodate gripping of a target object.

4. The adjustable support of claim 3 effective for grasping, or stabilizing a component of a subsea oil production facility.

5. The adjustable support of claim 4 wherein the alignment element is a threaded screw.

6. The adjustable support of claim 4 wherein the alignment element is a hydraulic cylinder.

7. The adjustable support of claim 4 wherein the alignment element is a rod.

8. A method for supporting a component of unknown dimensions with a set of first grippers connectable to a first block moveable along an alignment element and a set of second grippers connectable to a second block moveable along the alignment element comprising:
   adjusting the position of the grippers to conform with the dimensions of the component by moving the first block relative to the second block in a linear manner along a length of the alignment element;
   engaging the grippers to stabilize the component by turning the alignment element;
   connecting a standoff comprising an arm and a backing plate having one or more tracks to the first block and second block by attaching fasteners through the tracks; and
   tightening a plurality of nuts located along the alignment element to lock the grippers.

9. An adjustable support comprising:
   a first gripper;
   a second gripper separated from the first gripper by a linear distance;
   a first block connectable to the first gripper;
   a second block connectable to the second gripper;
   an alignment element connectable to the first block and the second block, which moves at least one of the first gripper and the second gripper in a linear manner when it is turned to adjust the linear distance between the first gripper and the second gripper;
   a standoff connectable to the first block and the second block, wherein the standoff comprises an arm, which is connectable to a backing plate having one or more tracks;
   wherein the first block and the second block each comprise one or more side plates, each optionally having one or more connection holes and one or more end plates, each having one or more alignment holes;
   wherein the first block is connectable to the second block by threading the alignment element through the alignment holes in the end plates;
   wherein the standoff is connectable to the first block and the second block by aligning the tracks on the backing plate with the connection holes in the side plates, and inserting fasteners in the connection holes.

* * * * *